United States Patent [19]

Ozin et al.

[11] Patent Number: 4,569,924

[45] Date of Patent: Feb. 11, 1986

[54] METAL CARBON CATALYST PREPARATION

[76] Inventors: Geoffrey A. Ozin, 63 Gormley Ave., Toronto, Ontario, Canada, M4V 1Y9; Mark P. Andrews, 374 Markham St., Toronto, Ontario, Canada

[21] Appl. No.: 556,003

[22] Filed: Nov. 30, 1983

Related U.S. Application Data

[63] Continuation of Ser. No. 454,885, Dec. 30, 1982, abandoned.

[51] Int. Cl.⁴ .................. B01J 23/20; B01J 23/22; B01J 23/26; B01J 23/28; B01J 23/30; B01J 23/42; B01J 23/44; B01J 23/46; B01J 23/50; B01J 23/52; B01J 23/72; B01J 23/74
[52] U.S. Cl. .................. 502/184; 502/101; 502/182; 502/185; 204/129; 429/13
[58] Field of Search ............... 502/101, 182, 184, 185

[56] References Cited

U.S. PATENT DOCUMENTS

| | | | |
|---|---|---|---|
| 3,316,124 | 4/1967 | Kronenberg | 502/185 X |
| 3,352,719 | 11/1967 | Schneider | 502/184 X |
| 3,502,509 | 3/1970 | Sindorf | 502/101 |
| 4,028,274 | 6/1977 | Kunz | 502/155 X |
| 4,292,253 | 9/1981 | Ozin et al. | 260/438.5 X |

OTHER PUBLICATIONS

Matsuo et al., J. Org. Chem., 1982, vol. 47, pp. 843–848.

*Primary Examiner*—Patrick P. Garvin
*Attorney, Agent, or Firm*—Lalos, Keegan, Marsh, Bentzen & Kaye

[57] ABSTRACT

Carbon-metal catalysts having a substantial amount of catalytically active metal, e.g. silver, deposited thereon in zero-valent, small cluster form, are prepared by vaporizing the metal under low vapor pressure conditions in the vicinity of an organic liquid solvent e.g. tetrahydrofuran, such that the metal dissolves in the solvent as a labile solvated zero-valent metal complex. This complex is contacted with the carbon so that the complex diffuses onto the surface of the carbon and also into the pores thereof.

14 Claims, 3 Drawing Figures

METAL CARBON CATALYST PREPARATION

This application is a continuation of Ser. No. 454,885, filed Dec. 30, 1982 and now abandoned.

FIELD OF THE INVENTION

This invention relates to solid catalysts for performing heterogeneous phase reactions, and processes for their preparation. More particularly, it relates to metal catalysts in which the metal atoms are present in small cluster form, in association with carbon supports, and processes for their preparation.

BACKGROUND OF THE INVENTION AND PRIOR ART

Heterogeneous catalysis processes, using metal catalysts, are of commercial importance in a large number of chemical and petrochemical processes. In all cases, the economic performance of the processes depends, to a greater or lesser extent, on the activity of the catalyst, its selectivity towards the desired reaction product, and the cost and complexity of preparation of the catalyst in its most advantageous form for use in the particular process under consideration. For most efficient catalysis, the catalyst should have large metallic surface area, i.e. a large surface to bulk ratio.

This is achieved by producing the catalyst comprising individual occurrences of metal atoms (monoatomic) where most of the metal atoms are atoms in the zero-valent form and wherein the individual occurrences of metal atoms (monatomic) form aggregates or clusters, exhibiting molecular metal properties as opposed to colloidal, bulk metal properties. As used herein, the term "cluster" refers to metal atoms weakly or strongly coupled, through space or through a support a significant proportion of the metal atoms being in the zero-valent state and generally separated by a distance of six Angstrom (Å) or less. Such a cluster includes any aggregation of two or more metal atoms, of the same or different species, regardless of whether they occur in substantially one dimensional form (i.e. a chain of metal atoms), or two dimensional form (i.e. a planar arrangement), a spiral arrangement or a three dimensional structure.

When bulk metals, especially transition metals, are vaporized e.g. by resistive heating, the initially formed vapor is in the monatomic condition. Very rapidly indeed, under normal conditions, the single metal atoms agglomerate into small clusters on a surface, and then very rapidly bulk, colloidal metal is formed by further agglomeration.

U.S. Pat. No. 4,292,253, Ozin and Francis, issued Sept. 29, 1982, describes a process for preparation of a catalyst in which the catalytic metal is present, in significant amounts, in small cluster form and is stable at or near room temperature. The process described involves the generation of vapors of the metal in a high vacuum environment and in the vicinity of a liquid polymer having reactive groups, so that the metals are effectively "trapped" by the polymer in monatomic or small cluster form and prevented from recombining to form colloidal metal. This work showed that the metal was anchored at specific reactive sites of the polymer structure, with further depositions of metal atoms causing growth in the cluster sizes rather than creation of additional clusters at new nucleation sites.

It is known to provide solid catalysts comprising various metals deposited on an inert carbon support. The carbon support, normally in particulate form, is treated by washing with a solution of a reducible salt of the appropriate metal. Then the support carrying the salt of the metal is subjected to reducing conditions, e.g. using hydrogen, to form metal on the surface of the carbon particles. Such catalysts are useful in a variety of reactions including hydrocarbon cracking, hydrocracking, hydrocarbon reforming and the like as described by B. C. Gates, J. R. Katzer, and G. C. A. Schuit, "Chemistry of Catalytic Processes", McGraw-Hill, N.Y., N.Y. 1979 and in electro-catalytic processes, e.g. as fuel cell electrodes. As in all heterogeneous catalysts, the most active forms are those which present the largest ratio of surface atoms to internal atoms of catalytic metal, so that the presence of the metal in individual occurrences and in small cluster form on the surface of the carbon particles is desirable.

SUMMARY OF THE INVENTION

It is an object of the present invention to provide a carbon-metal catalyst useful in heterogeneous phase chemical reactions.

It is another object of the present invention to provide a carbon-metal catalyst useful in heterogeneous phase chemical reaction wherein said catalyst is comprised of carbon having deposited thereon a useful amount of catalytically active metal, wherein the metal is comprised of individual occurrences of metal atoms and clusters formed by aggregation of the metal atoms.

It is another object of the present invention to provide a carbon-metal electrode for use in a fuel cell and having metal comprised of individual occurrences of metal atoms and clusters formed by aggregation of the metal atoms, deposited on carbon.

It is still another object of the present invention to provide a carbon-metal catalyst useful in heterogeneous phase chemical reactions wherein the carbon support is an allotropic form of carbon, especially graphite.

It is further an object of the present invention to provide a novel process for preparing carbon-metal catalysts useful in heterogeneous phase chemical reactions.

It is still a further object to provide such a process which produces such catalysts having small clusters of zero-valent, catalytically-active metal.

It is yet another object of the present invention to provide said process wherein the carbon support is an allotropic form of carbon especially graphite.

In the process of the present invention, metals are deposited onto carbon catalyst supports, in a catalytically active form, by deposition of solvated metal atoms or clusters from solution in a liquid organic or inorganic solvent. The desired catalytic metal is vaporized into the liquid solvent. Monatomic zero-valent metal which can aggregate to small clusters in the liquid is produced in the vaporization process. The metal becomes solvated by the solvent in the form of a labile solvated metal complex dissolved in the solvent. In this form, the solvated metal complex and solvent contact the carbon support, so that solvated metal can deposit onto the surface of the carbon support. After sufficient metal complex has deposited onto the carbon support, the excess of solvated metal complex and liquid solvent can be removed, e.g. by filtering, and then the composite may be warmed and subjected to vacuum conditions. In this way, the surface attached labile solvated metal complex decomposes, leaving metal on the surface of the carbon support, in either monatomic or small cluster form. The resultant metal-loaded carbon catalyst is stable at room or elevated temperatures, and has catalytic activity.

In the process of the invention, there is no need for the carbon catalyst support to have reactive groups to which the metal atoms may attach, as in the case of the liquid polymer-metal cluster catalyst of the prior art referred to above. Instead, the metal atoms are "trapped" in an inert liquid solvent, to form labile monatomic or small cluster complexes therein, and then anchored to a carbon support in manatomic or small cluster form.

BRIEF DESCRIPTION TO THE DRAWINGS

DESCRIPTION OF THE PREFERRED EMBODIMENTS

Figure 1:
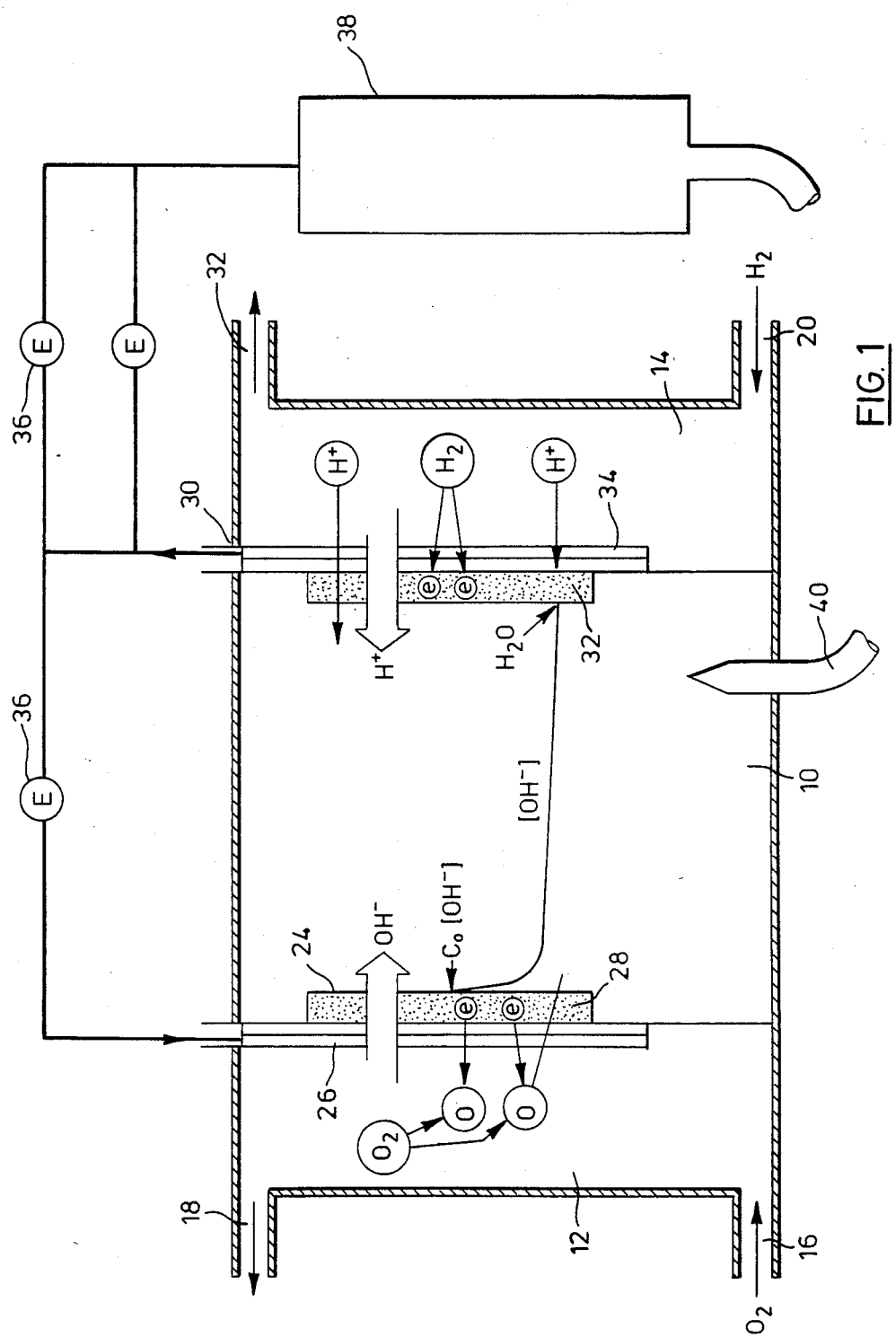
FIG. 1 is a diagrammatic illustration of a fuel cell utilizing catalytic electrodes prepared according to the invention, as described in Example 4.

Preferred metals for use in the process of the present invention are transition metals such as titanium, zirconium, vanadium, niobium, tantalum, molybdenum, chromium, iron, cobalt nickel, rhodium, ruthenium, osmium, iridium, palladium, platinum, tungsten, copper, silver and gold. Most preferred are the metals palladium, platinum, molybdenum and silver. Preferred forms of carbon are particulate carbon blacks, especially porous forms having a crystalline lattice. The carbon should have good thermal and chemical stability, and only weak interaction with the chosen metal. Specific examples of commercially available, suitable carbons are Vulcan XC-72, from Cabot Carbon Corporation, and Shawinigan 100, from Shawinigan Chemical Company. Any form of particulate, inert carbon or an allotropic form, e.g. graphite can be used in the process of this invention.

Some forms of carbon have large contaminations of oxygen, especially at the surface, creating oxygen-chemical functionality at the surface. It is undesirable to use such carbon supports with easily oxidizable metals, for fear of losing the zero-valent nature of the metal in situ. In such cases, the carbon support should be pre-treated to deoxygenate it, before the metal is deposited thereon. Such pretreatment of the carbon support is not however essential in the present invention.

The precise type of carbon for use is thus chosen, having regard for the metal to be deposited and the catalytic use to which the catalytic material is to be put. For example, in use as a catalytic fuel cell electrode, the carbon support for the catalyst should be macroporous to gases.

The conditions under which the catalyst is prepared should be chosen so that the solvated metal complex is readily formed and maintained long enough for contact with the carbon to be accomplished, without substantial colloidal metal formation in the solvent. The best conditions will vary depending upon the choice of metal and solvent. In most cases, the metal will need to be vaporized under conditions of low vapor pressure, to ensure that sufficient zero-valent monatomic or small cluster metal contacts the solvent. Also in most cases, the metal vaporization and solvent contacting should be done at low temperatures, since many of the suitable solvated metal complexes are only stable at low temperatures.

It is preferred to form a homogeneously dispersed slurry of the carbon catalyst support in the chosen solvent (in which the carbon is substantially insoluble), and then to contact the slurry with the vapor of the metal, or with a preformed solution of the solvated metal complex. In this way, the risk of formation of colloidal metal prior to contacting the carbon is minimized.

In order to obtain homogeneity of the metal dispersion throughout the carbon catalyst, it is preferred to vaporize the metal in the vicinity of a thin film of carbon-solvent slurry, the film being moved continuously relative to the source of vaporizing metal. One way of achieving this is to dispose the source of vaporizing metal at the approximate center of an evacuated rotating vessel containing the carbon-solvent slurry. In this manner, the slurry can be arranged to form a thin film on the walls of the rotating vessel surrounding the source of vaporizing metal, thereby ensuring an even exposure of the slurry to vaporizing metal and, as an end product, a relatively homogeneous solid catalyst. Alternatively, the metal vapor can be deposited into the preferred solvent, and subsequently the solution of solvated metal complexes so formed contacted with the carbon. Vaporization of the metal can be caused by a variety of known methods, such as resistive heating, electron beam bombardment, laser evaporation and the like, to cause localized heating only of the bulk metal. Suitably, the metal is contained in an electrically heated crucible located at the center of the rotating evacuated flask.

Suitable apparatus for conducting the process of the present invention is described in the prior art, and is commercially available. For example, such an apparatus is described in British patent specification No. 1,483,459 National Research and Development Corporation, published Aug. 17, 1977. A suitable apparatus is commercially available from G. V. Planer Ltd., Sunbury-on-Thames, England, under the designation "Vapor Synthesis Equipment type VSP 101" or "type VSP 302".

When the metal is vaporized into a non-solvating liquid for the chosen metal, e.g. silver is vaporized into a liquid alkane, a very broad distribution of silver cluster sizes of from about 100 to about 1000 Å is formed and deposited on a carbon support in the liquid slurry. Such a carbon-silver complex is of low stability, and is of limited use as a catalyst. It is nevertheless useful in a restricted number of catalytic processes, e.g. ethylene oxidation to ethylene oxide. More useful, however, are solvents which will solvate the chosen metal, since a greater homogeneity of cluster sizes is then obtained. For silver metal, such solvating solvents include ethers, olefins, aromatic hydrocarbons, amines and nitriles.

One technique for studying the nature of the solvated metal complexes and the clusters of silver metal to be deposited on the carbon support is plasma resonance absorption spectroscopy of the colloidal and sub-colloidal metal. This is an optical absorption technique in which the wavelength of maximum absorption ($\lambda_{max}$) and band width at half maximum height are observed, and related to the cluster growth behaviour as a function of silver metal loading, temperature and other parameters. By application of the classical scattering theory and modifications thereof of Mie in the small particle limit, one can estimate average particle size and monitor size distributions as functions of the above parameters.

In practice, it turns out that $\lambda_{max}$ does not change and the band width at half height does not change, with increased silver loading, other conditions being kept constant. The plasma resonance absorption, which is proportional to the concentration of silver atom clusters, and sensitive to particle size, increases linearly with the silver concentration, indicating that the silver atoms find their way to specific solvating sites of the solvent, and grow to a certain cluster size at each site (mono-dispersion). All the generated clusters contribute to substantially the same size distribution, which does not change with time during the metal vapor deposition/growth period. Instead, as mentioned, the number of cluster particles contributing to this distribution is linearly proportional to the amount of deposited metal. A saturation loading can be reached, after which the cluster size distribution broadens. The precise range of the cluster size distribution is dependent upon the nature of the solvent and the temperature contact. In this form, the solvated silver clusters contact and are deposited on the carbon support.

An example of a specific combination of carbon, solvent and metal in accordance with the present invention is particulate, porous carbon black, tetrahydrofuran (THF) and silver, and so for convenience the process of the present invention will be further described with reference thereto. However, this is in no way to be construed as limiting the scope of the invention, and is for ease of further and complete description of the process only.

Silver metal is vaporized by resistive heating, in an apparatus comprising an evacuated flask adapted to rotate on an inclined angle, the vaporizing silver being located in a crucible substantially at the center of the flask. Prior to addition to the flask, the solvent is dried and deoxygenated, and the carbon may be suitably deoxygenated as previously mentioned. The slurry is cooled in the flask to a predetermined temperature, and the vapour pressure is suitably lowered. Suitably, for quantitative deposition of metal, it is preferred than an in situ mass monitor such as a quartz crystal microbalance be employed. The flask contains the slurry of carbon in THF. As the metal is vaporized, the flask is rotated about the source of vaporization so that the liquid slurry of solid carbon and liquid THF forms a thin film on the walls of the flask. The vaporized silver, in monatomic form Ag(O) contacts and becomes solvated by the THF, dissolving therein in the form of a solvated silver atom labile complex. The solvated silver atom undergoes further reaction with solvated silver atoms or small solvated silver clusters in the THF, to form larger complexes. These complexes each grow only to a certain size before they are removed from further reaction in the solvent. This process is conducted at low vapor pressures within the flask, e.g. $10^{-3}-10^{-5}$ torr, and at low temperatures, e.g. $-100°$ C.

The thus solvated silver complex comprising single or multiatoms of silver, contacts the carbon in the slurry in this form, and deposits onto the surface of the carbon particles in this form. The metal vaporization process in the presence of the slurry is continued under these conditions for a suitable period of time until the desired degree of solvated metal complex loading onto the carbon has been attained. As more silver metal is vaporized in this process, more and more silver particles of about the same size distribution are formed in the solution. Spectroscopic analyses have indicated that they are well-defined small clusters of silver atoms Ag(O), down to about 10 Å size.

Next, the slurry is removed from the contacting vessel, and the carbon-silver solid is separated from excess THF and residual solvated silver complex dissolved therein. For this purpose, the low temperature should preferably be maintained, so that the silver is maintained in very small cluster form. Filtration, at low temperatures but above the solvent freezing point is a suitable procedure. Higher temperatures of filtration lead to deposition of larger silver particles onto the carbon, which are still useful but normally less catalytically active.

After the filtration, the solid carbon-silver catalyst is washed to remove excess solvent and solvated metal complex, and then allowed to warm up to room temperature, whilst subjected to vacuum pumping to remove most of the residual THF. The affinity of the silver metal clusters for the carbon surface is sufficient to ensure the stability of the carbon-silver cataklyst whilst the warming takes place, and subsequent colloidal metal formation on the outside surface of the carbon will be prevented.

As a result, a loading of silver of any desired weight percent, based on the weight of the carbon, is achieved in the catalyst. Typical silver or other metal loadings are in the 0.1-15 weight percent range. The material is now stable at room temperatures. In the case of certain metals, e.g. molybdenum and other easily oxidizable metals, the material must be stored in vacuo or under inert atmpsphere, e.g. argon, until it is to be used. In other cases, e.g. materials containing silver, plantinum and palladium, they can safely be stored in air. No further activation treatment of the material is normally necessary before it is employed as a catalyst, apart from removal of residual solvent, its metal component already being present as a catalytically active zero-valent form. The material can be used in any of the heterogeneous phase catalytic processes for which similar supported metal catalysts have previously been used, for example, fuel cell electrodes, hydrogenation, hydrogenolysis, dehydrogenation, Fischer Tropsch reactions, catalytic carbon monoxide hydrogenation, and ammonia synthesis. The material can also be used as electrodes to catalyse the fuel cell half cell reaction: $2H_2+O_2\rightarrow H_2O+4e$. Analysis has indicated that about 80-90% of the silver metal associated with the catalyst is present in small cluster (less than 100 atoms) form.

Alternative solvents for use in the present invention include, in addition to tetrahydrofuran, methyltetrahydrofuran, 2,5-dimethyltetrahydrofuran, toluene, glyme (dimethyl ether of ethylene glycol), diglyme (dimethyl ether of diethylene glycol), alkenes, oligo- and poly-olefins, acyclic or cyclic dienes, e.g. cyclopentadiene, cyclooctadiene, squalene, amines (e.g. hexaethylene pentamine), ethers, oligo- and poly-ethers, crown ethers, aza-crown ethers, siloxanes, oligosiloxanes and polysiloxanes, aromatic hydrocarbons (xylenes, mesitylene, methylnaphthalenes, etc.) and nitriles such as acetonitrile. Mixtures of two or more solvents can also be used. Other solvent examples will readily occur to those skilled in the art. Their choice is determined by their ability to solvate the chosen catalytic metal in zerovalent form, their inertness towards the carbon, their ease of removal from the carbon and their freezing and boiling points and vapor pressure, all factors readily determinable from standard reference works. Toulene is especially suitable with the platinum group metals, with $-100°$ C. being a suitable operating temperature for preparing the catalyst. 1,5-Cyclo-octadiene is suitable with iron, cobalt, nickel, palladium and platinum. Tetrahydrofuran and methyltetrahydrofuran are suitable for use with silver and palladium, operating at temperatures in the $-90°$ C. to $-125°$ C. range. Glymes (glyme, diglyme, triglyme, etc.) suitable for use with silver, molybdenum and chromium, can be operated at temperatures of about $-30°$ C. to $-60°$ C.

If desired, using the process of the present invention, one can prepare catalysts having metal clusters of two or more different metals in or on the carbon. This is accomplished by choosing a solvent or mixture of solvents which will solvate each of the chosen metals, and vaporizing the metals either simultaneously or successively in the vicinity of the solvent as described above.

For use as a catalytic fuel cell electrode, porous graphite having metal clusters e.g. silver clusters deposited thereon as previously described is suitably homogenized with a teflon emulsion, pressed into a sheet, backed by a porous sintered nickel disc or a graphite disc such as Stackpole graphite. The clusters are present on the surface and in the pores of the carbon. The efficiency of the electrode in the fuel cell is dependent upon the cluster size and cluster size distribution. The composite is stable in air.

The invention is further described in the following specific examples, for illustrative purposes only.

EXAMPLE 1

A slurry of 1.5 g of unactivated Vulcan-XC72 carbon (Cabot Corporation) was dispersed by ultrasonification in 150 ml dry, distilled, inhibitor-free 2-methyltetrahydrofuran, contained in a 2 liter flask designed to fit a rotary metal vapour reactor. Once in place, the flask and contents were cooled to $-110°$ C. and 0.0206 g of silver was resistively vapourized into the slurry at a pressure of $2 \times 10^{-5}$ torr, over a period of $\frac{3}{4}$ hour. The deposition rate was monitored by means of a quartz crystal oscillator situated just above and behind the crucible. The flask was rotated at approximately 60 rpm throughout the deposition period, this frequency of rotation being adequate to maintain proper cooling of the spun thin film band into which the silver was being deposited. After the vapourization period was concluded, the slurry was transferred by means of a positive nitrogen gas pressure via a cold transfer tube maintained at $-115°$ C. to a filter frit cooled to this same temperature. The carbon was separated from the solvent at this temperature over a period of four hours by vacuum filtration, and then evacuated to dryness at room temperature. Electron microscopy revealed the presence of carbon supported silver particles varying in size from 10 Å to 30 Å.

EXAMPLE 2

The same procedure as described in Example 1 was used in this instance except that 2.0 g of Vulcan XC-72 carbon was combined with 175 ml dry, distilled tetrahydrofuran. Approximately 0.2 g of silver was evaporated over one hour into the slurry as described above. In this case the slurry was filtered at room temperature after contacting the cold silver-tetrahydrofuran-carbon slurry in a spinning flask for one hour after the deposition had ceased. Electron microscopy revealed particle sizes ranging from 10 to 30 Å.

EXAMPLE 3

In a similar manner to the experiments described above, 0.1773 g of palladium was vaporized over a period of one hour into 2.0 g of unactivated Shawinigan 100 carbon (SH-100) as a slurry in 150 ml of dry, distilled toluene in a 2 liter rotary flask. The reaction was performed at $-100°$ C., transferred at $-100°$ C. and filtered at $-78°$ C. over a period of five hours in the manner described above. After filtration, the carbon-palladium residue was washed five times with 10 ml volumes of dry, distilled hexanes. The residue was then evacuated to dryness for two days at room temperature to give a 9% palladium-carbon catalyst based upon the amount of palladium evaporated. The palladium carbon catalyst of this Example was shown to be active in hydrogenation of ethylene and toluene under normal flow reactor conditions.

EXAMPLE 4

A catalyst of 10% silver deposited upon carbon XC-72, prepared as described in the previous examples, was tested as an oxygen electrode in a fuel cell, alongside a commercial platinum-graphite hydrogen electrode in an oxygen plus hydrogen fuel cell as diagrammatically illustrated in FIG. 1. The fuel cell vessel has a central compartment 10 containing conductive electrolyte (50% aqueous solution of potassium hydroxide), an oxygen compartment 12 and hydrogen compartment 14, the three compartments being sealed from one another. Oxygen inlet and outlet ports 16 and 18 feed oxygen gas into and out of oxygen compartment 12. Similar inlet and outlet ports 20, 22 are provided in hydrogen compartment 14.

The oxygen electrode 24 comprises a dry, porous graphite 26 and a silver-on-carbon catalyst 28 prepared according to the present invention. To prepare the electrode from the silver-carbon catalyst, a suitable quantity of the catalyst e.g. 200 mg is combined with 30 mls distilled water, 3 mls isopropanol and 1 drop of surfactant (Photoflow), followed by ultrasonification to disperse the mixture. Then, 130 mg of resin polytetrafluoroethylene (60% solids) to give a 30% w/w teflon carbon ratio is added. The ingredients are mixed together, deposited on Stackpole carbon by gentle vacuum filtration, sintered in an oven at the melting point of teflon under a nitrogen purge.

The hydrogen electrode 30 comprises a commercial platinum-on-carbon catalyst 32 deposited on porous graphite 34.

The electrodes are connected to an external circuit whereby a variable resistance 36 can be applied. Measurements are taken of voltage and current, as various levels of exterior resistance.

The external circuit is also connected to a platinum black reference electrode 38, connected to the electrolyte of the central compartment 10 via a Luggin capillary 40.

Figure 2:
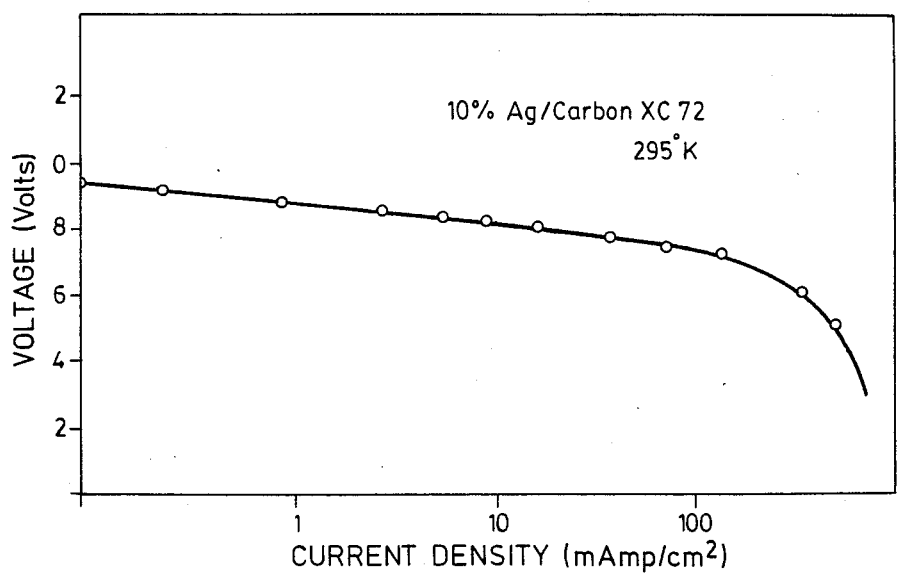
FIG. 2 is a graphical presentation of cell potential versus current density relationship for the cell shown in FIG. 1 and operated as described in Example 4.

The results are presented graphically in FIG. 2. This is the cell potential versus current density curve, derived from a 10% silver-on-carbon XC-72 catalyst, measured at 22° C. or 295° C. As can be seen from the curve, substantially increased current can be obtained over a wide range of current densities, without substantial drop in voltage.

Figure 3:
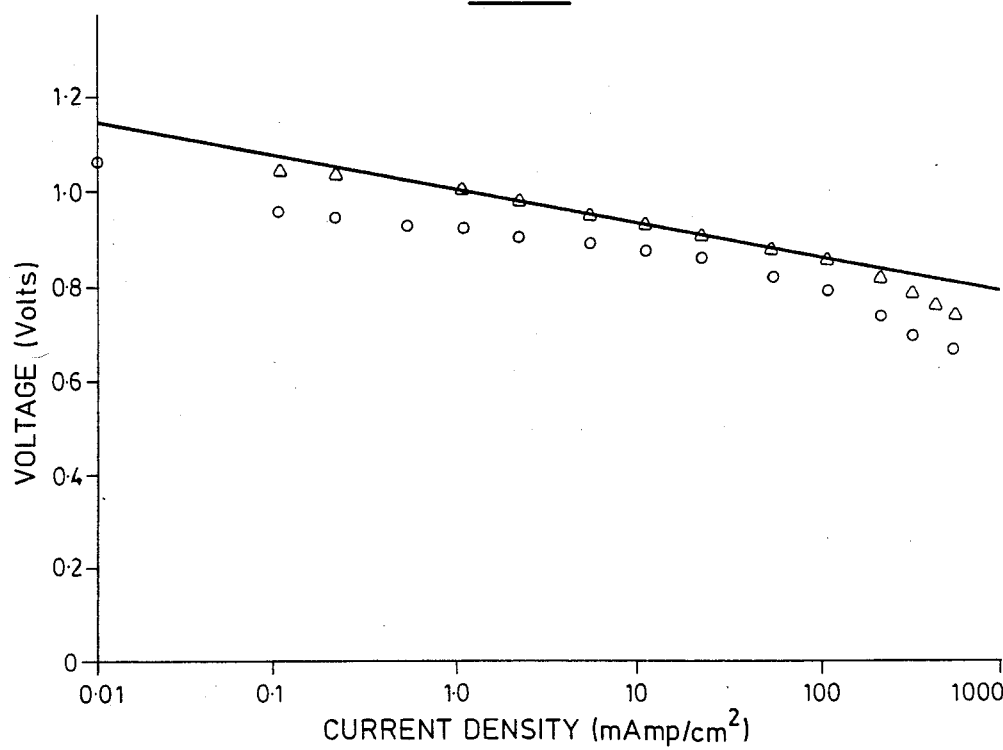
FIG. 3 is a similar cell potential curve derived from Example 4.

FIG. 3 presents graphically the cell potential versus current density curve for different external resistances, for a 9% palladium catalyst prepared according to the present invention and used in a fuel cell as diagrammatically illustrated in FIG. 1. These results are plotted alongside those obtained in a similar test from a commercially available platinum catalyst, the upper line representing the results obtained from the commercial platinum catalyst. This illustrates that palladium-carbon catalysts prepared according to the present invention are comparable to and only slightly inferior to very much more expensive commercial platinum-containing catalysts.

We claim:

1. A process for preparing carbon-metal catalysts having a substantial amount of catalytically active metal deposited on the surface of the carbon wherein the metal is comprised of individual occurrences of metal atoms in the form of clusters, which comprises:

vaporizing the metal in the vicinity of an organic or inorganic liquid solvent;

dissolving the metal as a labile solvated zero-valent complex in the liquid solvent to form a liquid mixture of solvent and solvated zero-valent metal complex dissolved therein;

contacting said liquid mixture with a solid particulate carbon so as to cause deposition of the solvated metal complex onto the surface of the carbon;

and removing excess liquid solvent or solution from the carbon;

said liquid solvent being chosen from among solvents having the ability to solvate the chosen metal, and being inert towards the solid particulate carbon.

2. The process of claim 1 wherein the individual occurrences of metal atoms are in the form of small clusters of up to about 100 atoms per cluster.

3. The process of claim 1 wherein the metal vaporization, the dissolving of the metal, the contacting with the carbon and the removal of excess liquid all take place at a predetermined temperature from room temperature down to the freezing point of the chosen solvent.

4. The process of claim 3 wherein the metal is vaporized under conditions of low vapor pressure, in the vicinity of a moving film of the chosen solvent.

5. The process of claim 4, wherein the moving film of solvent comprises a pre-formed slurry of solvent and carbon.

6. The process of claim 3 wherein the metal selected from the group consisting of iron, cobalt, chromium, molybdenum, tungsten, titanium, zirconium, vanadium, niobium, tantalum, platinum, palladium, rhodium, ruthenium, osmium, iridium, nickel, copper, silver and gold.

7. The process of claim 3, wherein the metal is selected from the group consisting of palladium, platinum, molybdenum and silver.

8. The process of claim 3 wherein the solvent is selected from aromatic hydrocarbons, ethers, cyclic ethers, crown ethers, aza-crown ethers, oligo- and poly-ethers, glycols, alkenes, oligo- and poly-olefins, acyclic or cyclic dienes, siloxanes, oligosiloxanes, polysiloxanes, amines and nitriles.

9. The process of claim 8 wherein the metal is silver and the solvent is tetrahydrofuran.

10. The process of claim 8 wherein the metal is palladium and the solvent is toulene.

11. The process of claim 9 wherein the silver is vaporized in a rotating vessel containing a liquid slurry of carbon and THF, said slurry being disposed as a moving thin film on the walls of said rotating vessel.

12. The process of claim 1 wherein the carbon is graphite.

13. A carbon-metal catalyst having an effective amount of chemically active metal in the form of clusters of metal atoms, which is prepared by vaporizing the metal in the vicinity of an organic or inorganic liquid solvent;

dissolving the metal as a labile solvated zero-valent complex in the liquid solvent to form a liquid mixture of solvent and solvated zero-valent metal complex dissolved therein;

contacting said liquid mixture, with a solid particulate carbon so as to cause deposition of the solvated metal complex onto the surface of the carbon;

and removing excess liquid solvent or solution from the carbon, said liquid solvent being chosen from among solvents having the ability to solvate the chosen metal, and being inert towards the solid particulate carbon.

14. The catalyst of claim 13 wherein the metal is selected from the group consisting of palladium, platinum, molybdenum and silver.

* * * * *